(12) United States Patent
Tene et al.

(10) Patent No.: US 8,336,048 B2
(45) Date of Patent: Dec. 18, 2012

(54) REDUCING LATENCY IN A SEGMENTED VIRTUAL MACHINE

(75) Inventors: Gil Tene, San Carlos, CA (US); Michael A. Wolf, San Francisco, CA (US); Anirban Sengupta, Sunnyvale, CA (US); Sivakumar Annamalai, Cupertino, CA (US); Adrian Sun, Mountain View, CA (US)

(73) Assignee: Azul Systems, Inc., Sunnyvale, CA (US)

( * ) Notice: Subject to any disclaimer, the term of this patent is extended or adjusted under 35 U.S.C. 154(b) by 775 days.

(21) Appl. No.: 12/315,857

(22) Filed: Dec. 5, 2008

(65) Prior Publication Data

US 2009/0172665 A1 Jul. 2, 2009

Related U.S. Application Data

(62) Division of application No. 11/165,827, filed on Jun. 24, 2005, now Pat. No. 7,480,908.

(51) Int. Cl.
*G06F 9/455* (2006.01)
*G06F 21/00* (2006.01)

(52) U.S. Cl. .............................. 718/1; 711/6

(58) Field of Classification Search .................. None
See application file for complete search history.

(56) References Cited

U.S. PATENT DOCUMENTS

| | | | |
|---|---|---|---|
| 4,849,880 A | 7/1989 | Bhaskar et al. | |
| 5,479,643 A | 12/1995 | Bhaskar et al. | |
| 5,774,728 A | 6/1998 | Breslau et al. | |
| 6,003,065 A | 12/1999 | Yan et al. | |
| 6,230,118 B1 | 5/2001 | Bader et al. | |
| 6,345,311 B1 | 2/2002 | Breslau et al. | |
| 6,385,643 B1 | 5/2002 | Jacobs et al. | |
| 6,397,242 B1 | 5/2002 | Devine et al. | |
| 6,625,751 B1 | 9/2003 | Starovic et al. | |
| 6,738,977 B1 | 5/2004 | Berry et al. | |
| 6,802,062 B1 | 10/2004 | Oyamada et al. | |
| 6,968,539 B1 | 11/2005 | Huang et al. | |
| 7,036,122 B2 | 4/2006 | Bennett et al. | |
| 7,114,157 B2 | 9/2006 | Chaffee et al. | |
| 7,272,799 B2 | 9/2007 | Imada et al. | |
| 7,313,793 B2 | 12/2007 | Traut et al. | |
| 7,853,698 B2* | 12/2010 | Stanev et al. ............. | 709/227 |
| 2001/0034771 A1 | 10/2001 | Hutsch et al. | |
| 2002/0138578 A1 | 9/2002 | Zhou | |
| 2002/0184287 A1 | 12/2002 | Nunally | |
| 2003/0217092 A1 | 11/2003 | Veselov | |
| 2003/0229794 A1 | 12/2003 | Sutton et al. | |
| 2004/0073552 A1 | 4/2004 | Bailey et al. | |
| 2004/0148608 A1 | 7/2004 | Gendreau et al. | |
| 2004/0172629 A1* | 9/2004 | Tene et al. ..................... | 718/1 |
| 2005/0076326 A1 | 4/2005 | McMillan et al. | |

OTHER PUBLICATIONS

Czajkowski, Grzegorz, et al, "Automated and Portable Native Code Isolation", Sun Microsystems, SMLI TR-2001-96, Apr. 2001.
Wheeler, James G., "SmartArrays and Java Frequently Asked Questions", Feb. 5, 2001, SmartArrays, Inc., pp. 1-5.
Mayers, Chris, "Using Remote Procedure Call Standards", Mar. 24, 1996, Architecture Projects Management Limited, pp. 1-14.

\* cited by examiner

*Primary Examiner* — Kenneth Tang
(74) *Attorney, Agent, or Firm* — Van Pelt, Yi & James LLP (57) ABSTRACT

Providing data to an application running on a segmented virtual machine (VM) is disclosed. Providing data includes opening an interface between the segmented VM and an external data source, transferring data from the external data source to an interface buffer, transferring a first selected amount of data from the interface buffer to a shell VM buffer, transferring a second selected amount of data from the shell VM buffer to a core VM buffer, and providing portions of the data from the core VM buffer to the application in response to read requests from the application.

39 Claims, 10 Drawing Sheets

REDUCING LATENCY IN A SEGMENTED VIRTUAL MACHINE

CROSS REFERENCE TO OTHER APPLICATIONS

This application is a divisional of U.S. patent application Ser. No. 11/165,827, entitled SEGMENTED VIRTUAL MACHINE TRANSPORT MECHANISM filed Jun. 24, 2005 now U.S. Pat. No. 7,480,908 which is incorporated herein by reference for all purposes.

BACKGROUND OF THE INVENTION

In many computing environments, information may be passed from one device to another typically more powerful device to perform certain computing tasks, such as processing, storage, or communication. Such information may include processes, data, functions, or any other information that consumes computing resources. Information may be sent in packet form or in some other type of data stream in various applications. For example, a virtual machine (VM) may be segmented into two segments: a shell VM and a core VM. Function calls to the shell VM may be passed to the core VM for processing. Segmented virtual machines are further described in U.S. patent application Ser. No. 10/378,061, entitled SEGMENTED VIRTUAL MACHINE filed Feb. 28, 2003, which is incorporated herein by reference for all purposes.

Figure 1:
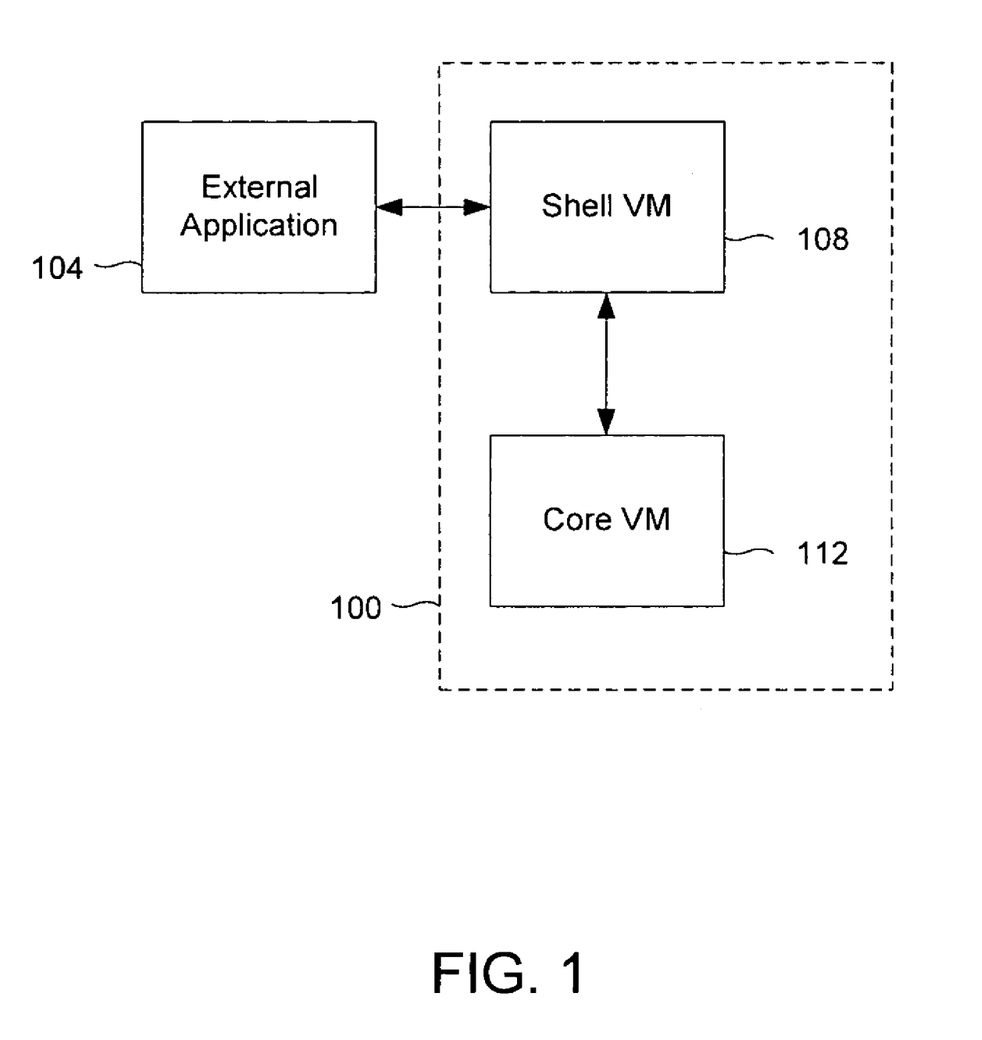
FIG. 1 is a block diagram illustrating a system with a segmented virtual machine 100.

FIG. 1 is a block diagram illustrating a system with a segmented virtual machine 100. In this example, VM functionality is segmented into shell VM 108 and core VM 112. Shell VM 108 performs interactions with the external environment, such as with external application 104. Core VM 112 performs VM internal execution functions. External interactions may be passed from external application 104 through shell VM 108 to core VM 112 for processing. For example, file or network I/O, operating system calls, and other native library interactions may be passed to/from core VM 112. These interactions may be forwarded using remote procedure calls (RPC). Many of these interactions may include reading or writing data streams to/from a network socket or a file. For example, an application running on core VM 112 opening a network socket connection may read data from the socket incrementally (e.g., one byte at a time). Each read is associated with a separate RPC, which introduces latency. If there is enough data being read, the latency can be significant. It would be desirable to reduce the latency associated with forwarding certain types of interactions through the shell VM.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A segmented virtual machine transport mechanism is disclosed. An application running on the core VM may open an interface to a data source. Data is "eagerly read" from the interface to a buffer in the shell VM. The data is transferred from the shell VM to the core VM so that it is locally available to the application running on the core VM. When writing data, the application "lazily writes" data to a buffer in the core VM. Data from the buffer is transferred to the shell VM for transmission over the interface.

Figure 2:
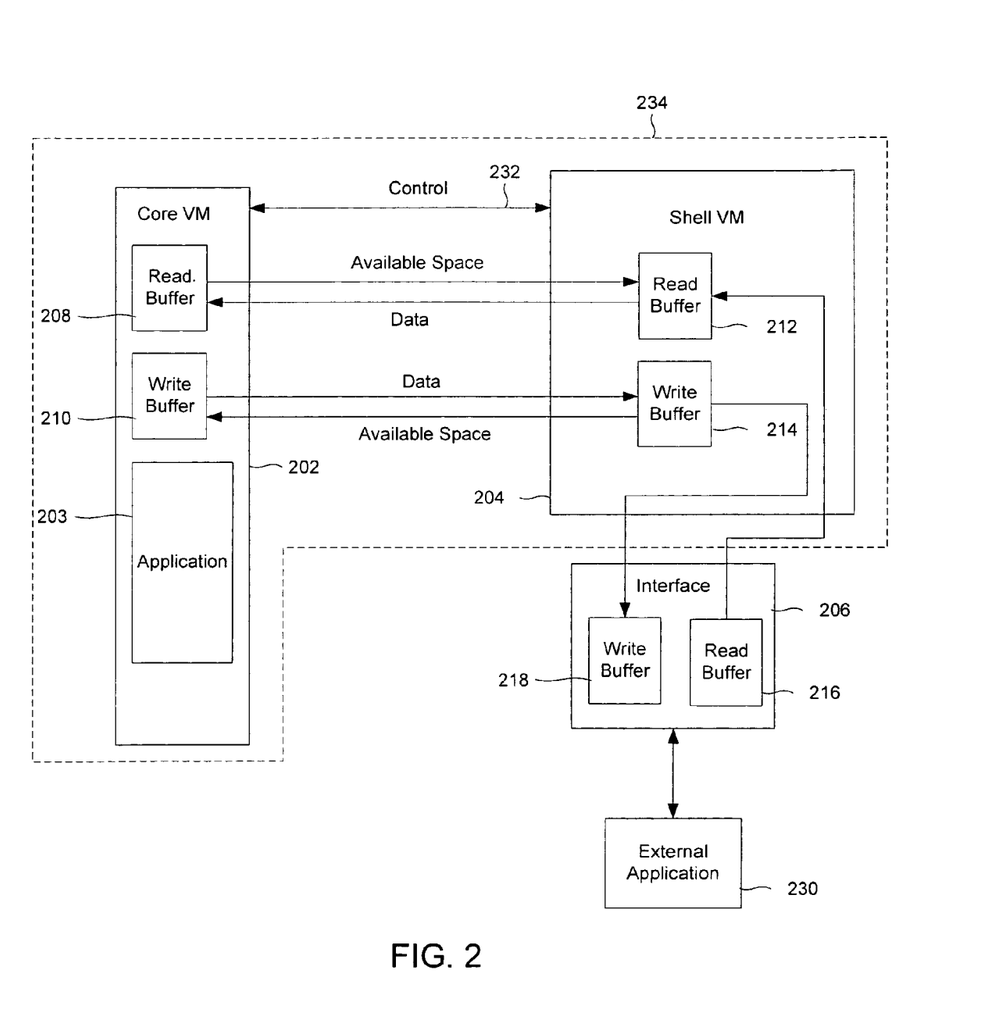
FIG. 2 is a block diagram illustrating a transport mechanism for decreasing latency in a segmented VM.

FIG. 2 is a block diagram illustrating a transport mechanism for decreasing latency in a segmented VM. In this example, system 200 is shown to include segmented VM 234 interacting with external application 230 over interface 206. Segmented VM 234 is shown to include core VM 202 and shell VM 204. Core VM 202 includes core VM read buffer 208 and core VM write buffer 210. Shell VM 204 includes shell VM read buffer 212 and shell VM write buffer 214. Interface 206 includes interface write buffer 218 and interface read buffer 216. Interface 206 is the interface to a logical channel between segmented VM 234 and external application 230. For example, the interface could be a socket, file descriptor, or other appropriate interface. The logical channel uses internal buffering for transferring data between external application 230 and segmented VM 234.

In this example, interface 206 resides in the operating system kernel, outside of shell VM 204. In other embodiments, interface 206 is resides in shell VM 204 and the interface and buffering is provided inside the shell VM process.

For example, this would be the case if it were tunneled over some other protocol, or used SDP or RDMA to bypass the buffering in the kernel.

In this example, application 203 running on core VM 202 has performed a setup process to create buffers 208-218. For example, control channel 232 between core VM 202 and shell VM 204 may be used to perform the setup process. Buffers 208-218 each may be of any size. In some embodiments, read buffers 208 and 212 are the same size and/or write buffers 210 and 214 are the same size. In some embodiments, the buffer sizes are adaptive. In other words, the size of each buffer may change based on the amount of data being read or written. In this example, a set of read and write buffers 208-218 is shown for one channel. In some embodiments, for each interface (e.g., file descriptor or socket), a separate set of read and write buffers is created on the core VM and shell VM.

Data arriving at interface 206 is read by shell VM 204 into shell VM read buffer 212. The data is sent from shell VM read buffer 212 to core VM read buffer 208, where the data is now locally available to application 203. Application 203 can access the data using a local call rather than an RPC, for example. Data arriving at interface 206 is "eagerly read" from interface 206 in that the data is read into shell VM read buffer 212 as soon as it is available at interface 206.

Data written by application 203 to core VM write buffer 210 is sent to shell VM write buffer 214. The data is written to interface write buffer 218 and is sent out on the interface (e.g., a socket or file I/O). The data is "lazily written" from core VM 202 in that the data is sent to shell VM write buffer 214 not necessarily as soon as it is available. For example, the data may be sent periodically, or whenever core VM write buffer 210 is full.

Figure 3:
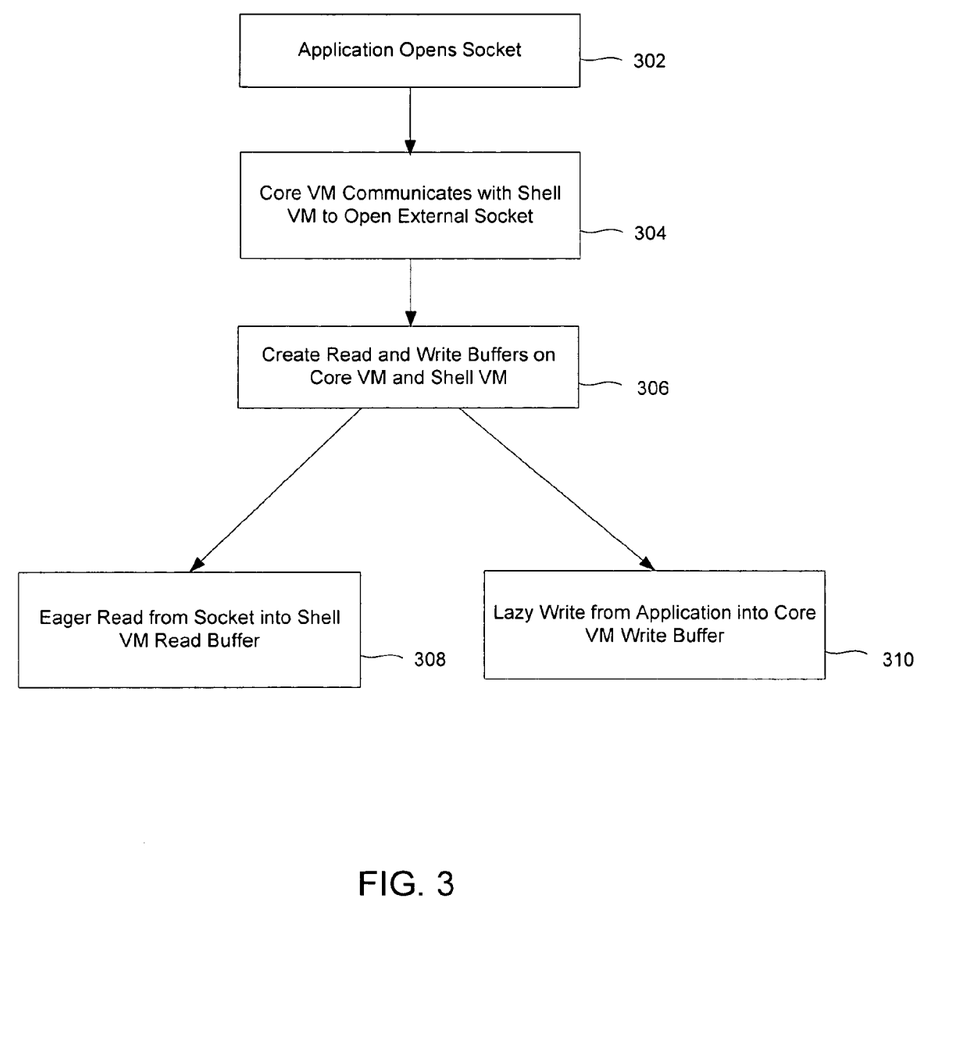
FIG. 3 is a flowchart illustrating a setup process for a transport mechanism in a segmented VM.

FIG. 3 is a flowchart illustrating a setup process for a transport mechanism in a segmented VM. In this example, a setup process is described for the case where the transport mechanism is used in a socket channel. An application opens a socket (302). For example, application 203 running on core VM 202 opens a socket connection to external data source 230. The core VM communicates with the shell VM to open an external socket (304). For example, core VM 202 uses control channel 232 to communicate with shell VM 204 to open external socket 206. Read and write buffers are created on the core VM and shell VM for the channel (306). For example, read buffers 208 and 212 and write buffers 210 and 214 are created.

Data is eagerly read from the socket into the shell VM read buffer (308). For example, data is eagerly read from interface read buffer 216 to shell VM read buffer 212. In some embodiments, the amount of data read is limited by the space available in the core VM read buffer. In other words, the data is read up to the space available in the core VM read buffer. For example, there are 2 bytes of space available in the core VM read buffer and 4 bytes of space available in the shell VM read buffer. 3 bytes are received at the interface read buffer and need to be transferred. Since there are only 2 bytes of available space in the core VM read buffer, only 2 bytes will be read from the interface read buffer even though the shell VM read buffer has 4 bytes of available space. The amount of space available in the core VM read buffer may be sent from core VM 202 to shell VM 204, as more fully described below. The data is sent from the shell VM read buffer to the core VM read buffer so that it is locally available to application 203.

In some embodiments, the amount of data read is limited by the space available in the shell VM read buffer, and the amount of data sent from the shell VM to the core VM is limited by the space available in the core VM read buffer.

Data is lazily written from the application into a core VM write buffer (310). For example, data is lazily written to core VM write buffer 210. In some embodiments, the amount of data written is limited by the space available in the shell VM write buffer. The amount of space available in the shell VM write buffer may be sent from shell VM 204 to core VM 202, as more fully described below. The data is sent from the core VM write buffer to the shell VM write buffer so that it can be sent out the socket 206.

In some embodiments, the amount of data written is limited by the space available in the core VM write buffer, and the amount of data sent is limited by the space available in the shell VM write buffer.

Any appropriate flow control or back pressure method may be used in this process. Duplicate and/or additive buffering may be used. For example, in some embodiments, the data in shell VM read buffer 212 is not deleted until the data in buffer 208 is consumed (i.e., read by application 203). Similarly, the data in core VM write buffer 210 is not deleted until the data in shell VM write buffer 214 is consumed (i.e., sent out the socket).

Figure 4A:
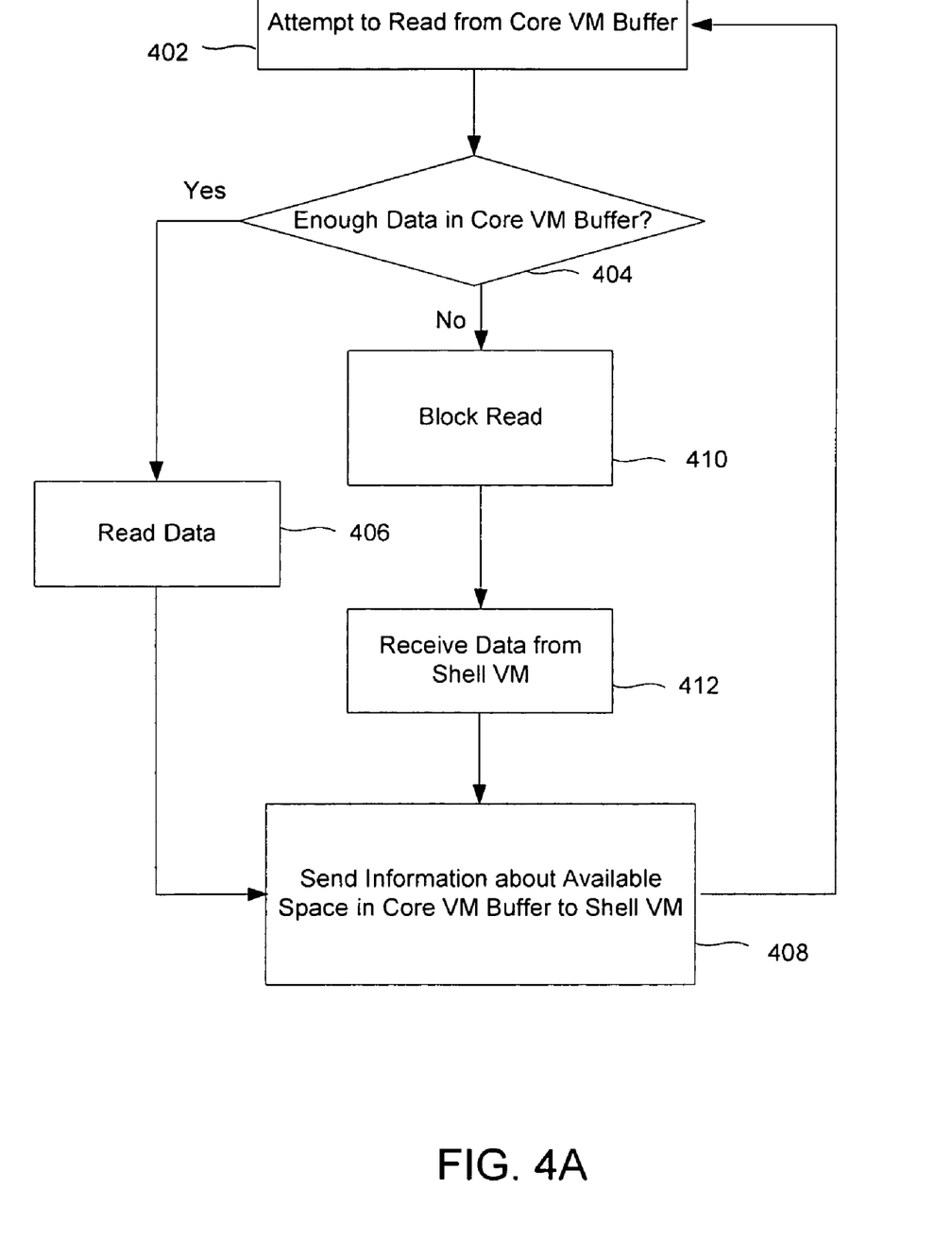
FIG. 4A is a flowchart illustrating a process of reading data at a core VM.

FIG. 4A is a flowchart illustrating a process of reading data at a core VM. In this example, a reading process is described for the case where the data is read from a socket channel. In some embodiments, this process is performed after the setup process of FIG. 3. In this example, a read from the core VM read buffer is attempted (402). For example, application 203 attempts to read 2 bytes from core VM read buffer 208. It is determined whether there is enough data in the core VM read buffer (404) to satisfy the read request. For example, if application 203 attempts to read 2 bytes, it is determined whether there are 2 bytes of data in core VM read buffer 208. If there is enough data, the data is read from the core VM read buffer (406). Information about the amount of available space in the core VM read buffer is sent to the shell VM (408). For example, information about the last read data (i.e., last consumed data) and last received data is sent. In some embodiments, an acknowledgement message (ACK) is sent to the shell VM. The ACK message could include the information about the amount of available space in the core VM read buffer. If the application attempts to read more data, the process starts again at (402).

Returning to (404), if it is determined that there is not enough data in the core VM read buffer to satisfy the read request, the read is blocked (410). Data is later received (412) from the shell VM. For example, the data could be received from the shell VM in (424), as more fully described below. Information about the amount of available space in the core VM read buffer is sent to the shell VM (408). The process returns to (402), in which the application attempts to read again. If a sufficient amount of data is present in the core VM read buffer, the read request is satisfied this time. In this example, when data arrives, the blocked read re-attempts the read. The read may be re-attempted at other time(s) in other embodiments.

Figure 4B:
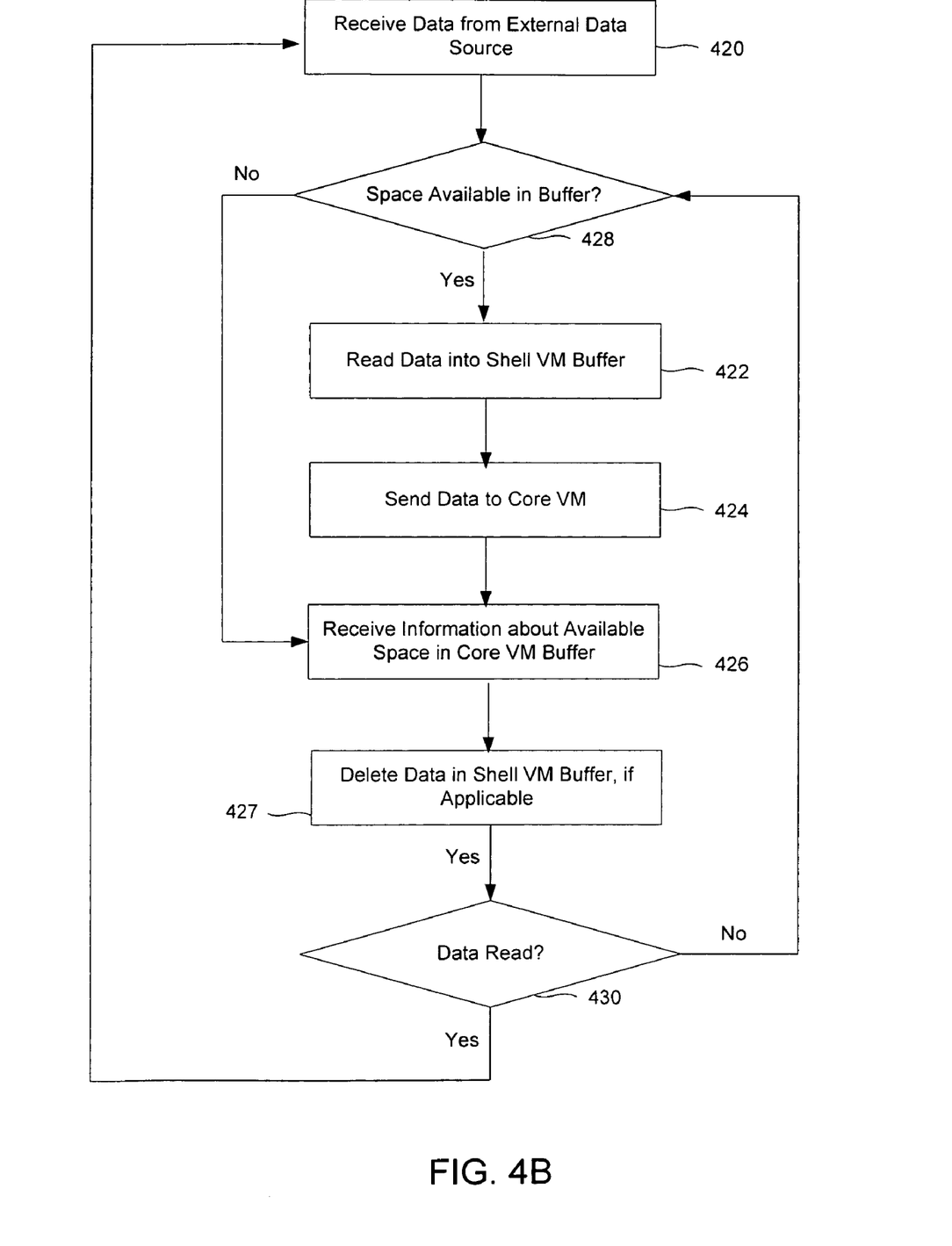
FIG. 4B is a flowchart illustrating a process of reading data at a shell VM.

FIG. 4B is a flowchart illustrating a process of reading data at a shell VM. In this example, a reading process is described for the case where the data is read from a socket channel. In some embodiments, this process is performed after the setup process of FIG. 3. In some embodiments, this process is performed in parallel with the reading process of FIG. 4A. In this example, data arrives from an external data source (420). For example, data arrives from external application 230 at socket interface 206 in interface read buffer 216. It is determined whether there is space available in the shell VM read buffer (428). In some embodiments, it is determined whether there is space available in the core VM read buffer. The determination may be based on information sent in (408).

If there is no space, the process goes to (426), as more fully described below. If there is space, data is read into the shell VM buffer (422). For example, data is read from interface read buffer 216 to shell VM read buffer 212. In some embodiments, the data is read up to the space available in the core VM read buffer. For example, the amount of space available in the core VM read buffer could be reported in (408). The data is sent to the core VM (424). For example, the data is sent from shell VM read buffer 212 to core VM read buffer 208. The data may be sent according to any appropriate transmit protocol. In some embodiments, the data is sent up to the space available in the core VM read buffer. Information about the amount of available space in the core VM read buffer is received (426). For example, the information could be that sent in (408), such as an ACK message. Data in the shell VM buffer is deleted, if applicable (427). For example, based on the information received in (426), the data that has been received and/or consumed by the core VM may be deleted in the shell VM, depending on the type of flow control used. It is determined whether the data received in the interface read buffer (420) was read to the shell VM read buffer (430). For example, interface read buffer 216 may have more data remaining after (422). For example, if there was no space available in (428), the data was not read. If the data was not read, the process returns to (428). If the data was read, the process ends. If new data arrives at the socket, the process starts again at (420).

Figure 5A:
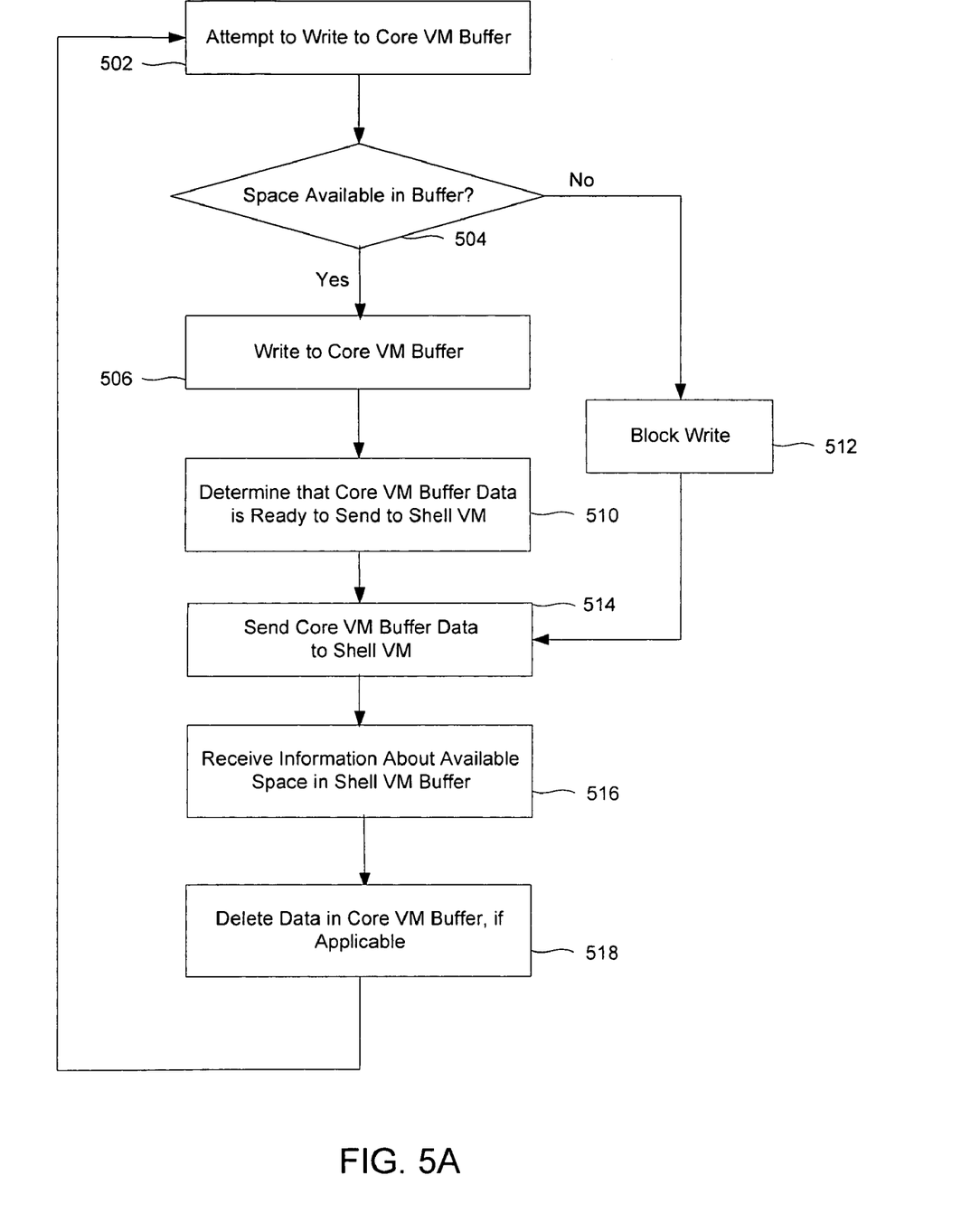
FIG. 5A is a flowchart illustrating a process of writing data at a core VM.

FIG. 5A is a flowchart illustrating a process of writing data at a core VM. In this example, a writing process is described for the case where the data is written to a socket channel. In some embodiments, this process is performed after the setup process of FIG. 3. In some embodiments, this process is performed in parallel with the reading processes of FIGS. 4A and 4B. In this example, a write to the core VM write buffer is attempted (502). For example, application 203 attempts to write 2 bytes of data to write buffer 208. It is determined whether there is enough space in the core VM write buffer (504) to satisfy the write request. For example, if application 203 attempts to write 2 bytes, it is determined whether there are 2 bytes of available space in write buffer 208. In some embodiments, it is determined whether there is space in the core VM write buffer on the shell VM. If there is enough space, the data is written to the core VM write buffer (506). For example, the data is written to core VM write buffer 210. In some embodiments, the data is written up to the space available in the shell VM write buffer. For example, the amount of space available in the core VM read buffer could be reported in (534), as more fully described below. It is determined that the data in the core VM write buffer should be sent to the shell VM (510). For example, the data is sent under one of the following conditions: the core VM write buffer is full; the core VM write buffer contains a certain amount of data (e.g., the amount of data equals the space available in the shell VM write buffer); or a predetermined amount of time has passed since the last data was written to the core VM write buffer (the data is sent after a timer expires) or since the last time the data was sent (the data is sent periodically). The data is sent to the shell VM (514). For example, the data is sent from core VM write buffer 210 to shell VM write buffer 214. The data may be sent according to any appropriate transmit protocol. In some embodiments, the data is sent up to the space available in the shell VM write buffer. Information about the amount of available space in the shell VM write buffer is received (516). In some embodiments, information about the last write data and last received data in the buffer is received. The information could be that sent in (534), as more fully described below. Data in the core VM buffer is deleted, if applicable (518). For example, based on the information received in (516), the data that has been received and/or consumed by the shell VM may be deleted in the core VM buffer, depending on the type of flow control used. If the application attempts to write more data, the process starts again at (502).

Returning to (504), if there is not enough available space, the write is blocked (512). In some embodiments, the process proceeds to (514) and the core VM write buffer data is sent to the shell VM (514). The process returns to (502) in which the application attempts to write again. If a sufficient amount of space is present in the core VM write buffer, the write request is satisfied this time. If the application attempts to write more data, the process starts again at (502).

Figure 5B:
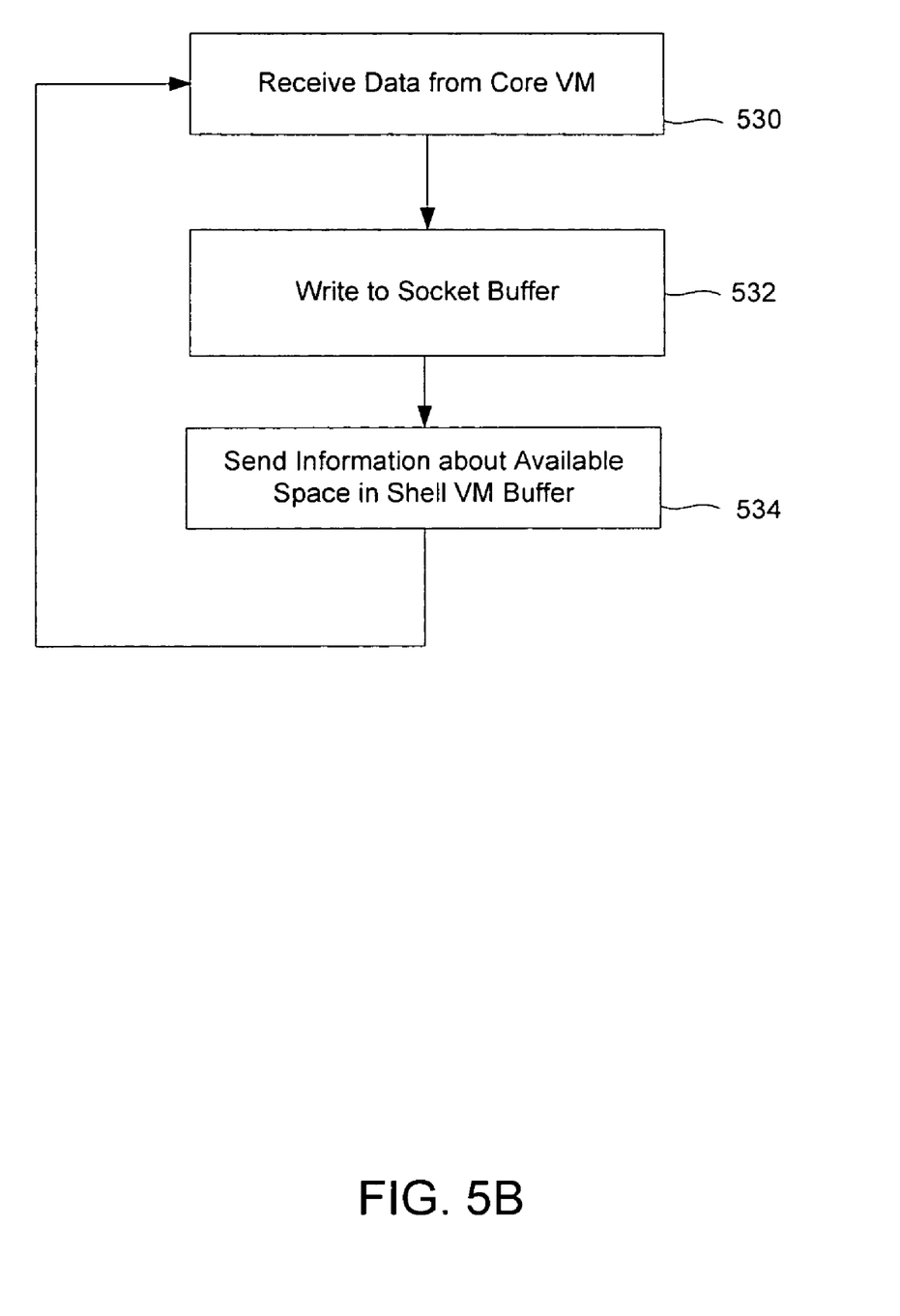
FIG. 5B is a flowchart illustrating a process of writing data at a shell VM.

FIG. 5B is a flowchart illustrating a process of writing data at a shell VM. In this example, a writing process is described for the case where the data is written to a socket channel. In some embodiments, this process is performed after the setup process of FIG. 3. In some embodiments, this process is performed in parallel with the processes of FIGS. 4A, 4B, and 5A. In this example, data is received from the core VM write buffer (530). For example, the data could be that sent in (514). For example, the data from core VM write buffer 210 is sent to shell VM 204 and placed in shell VM write buffer 214. The data is written to the socket buffer (532). For example, the data from shell VM write buffer 214 is written to interface write buffer 218. The data can then be sent over the socket connection. Information about the amount of available space in the shell VM write buffer is sent to the core VM (534). For example, the information could be that received in (516). If more data arrives from the core VM, the process starts again at (530).

Figure 6:
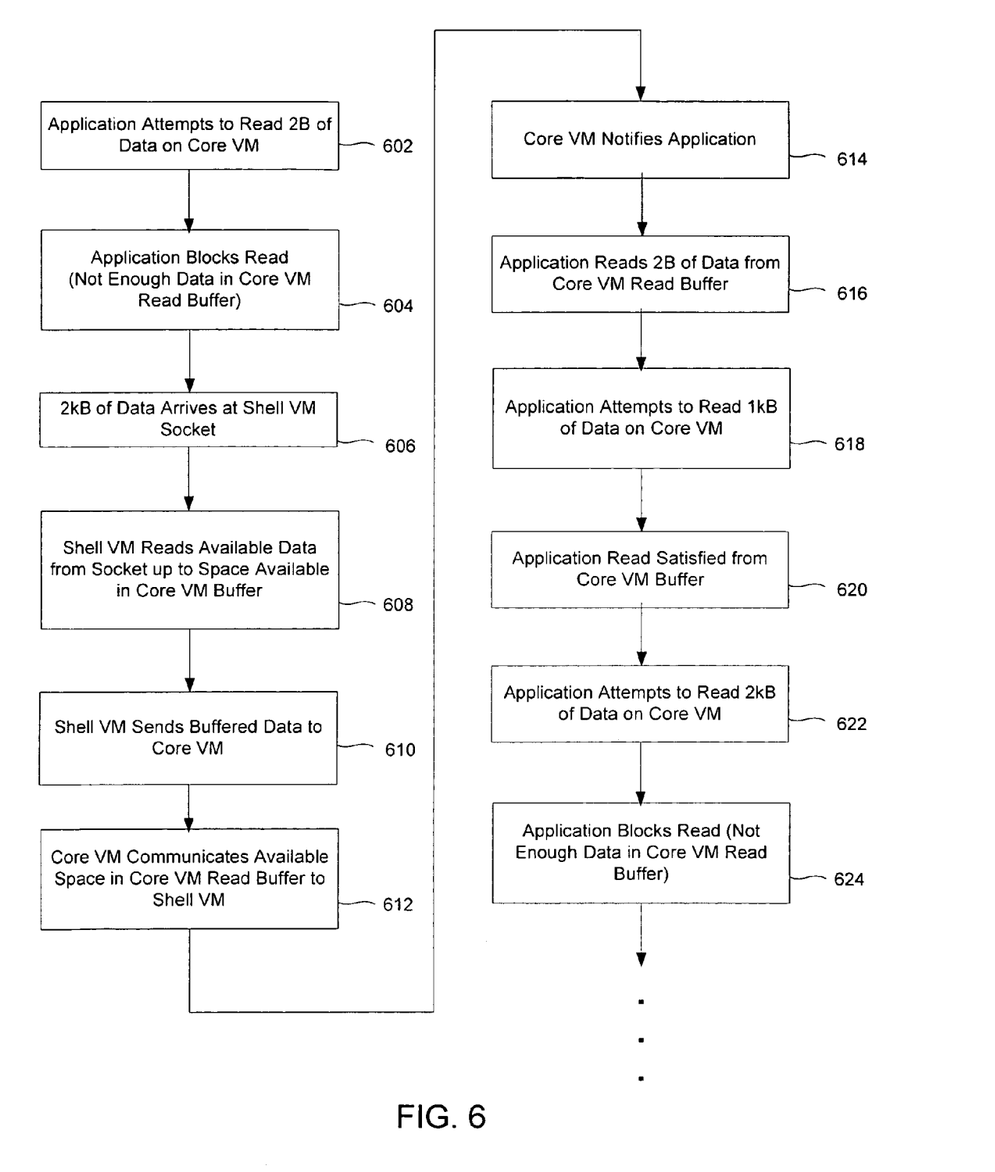
FIG. 6 is a flowchart illustrating an example of a sequence of reads from a socket.

FIG. 6 is a flowchart illustrating an example of a sequence of reads from a socket. This is an example of the processes of FIGS. 4A and 4B performed on system 200. In this example, core VM read buffer 208 is initially empty. Core VM read buffer 208 is 20 kB in size. In this example, application 203 attempts to read 2 bytes from core VM read buffer 208 (602). Application 203 blocks the read because there is currently not enough data in core VM read buffer 208 (604). 2 kB of data arrives at shell VM socket interface read buffer 216 (606). Shell VM 204 reads available data from socket buffer 216 up to the space available in core VM buffer 208 into shell VM buffer 212 (608). The space in core VM buffer 208 can be determined based on a previous ACK message sent from core VM 202, for example. In this example, core VM read buffer 208 is empty and is 20 kB in size, so all 2 kB are placed in shell VM read buffer 212. Shell VM 204 sends buffered data from shell VM read buffer 212 to core VM read buffer 208 (610). Core VM 202 communicates the amount of available space in core VM read buffer 208 to shell VM 204 (612). For example, an ACK message is sent that includes information about the data that was last received and data that was last consumed by core VM read buffer 208. Optionally, core VM 202 notifies application 203 that data has arrived at core VM read buffer 208 (614). Application 203 reads 2B of data from core VM read buffer 208 (616) to satisfy the blocked read request. Core VM read buffer 208 now has 2 kB-2 B of data. (614) is optional. For example, application 203 may later (e.g., periodically) attempt to read the 2 B of data. As shown, data is eagerly read from socket interface read buffer 216 and sent to core VM read buffer 208 so that it is locally available to application 203.

Application 203 then attempts to read 1 kB of data on core VM 202 (618). The read is satisfied (620). Core VM read buffer 208 now has 2 kB-2 B of data. Application 203 attempts to read 2 kB of data from core VM read buffer 208 (622). Application 203 blocks the read attempt because there is not enough data in core VM read buffer 208 to satisfy the read (624). The process continues similarly. As data arrives at interface 206, it is placed in shell VM read buffer 212. The data is sent from shell VM read buffer 212 to core VM read buffer 208 so that it is locally available to application 203 when requested.

Figure 7:
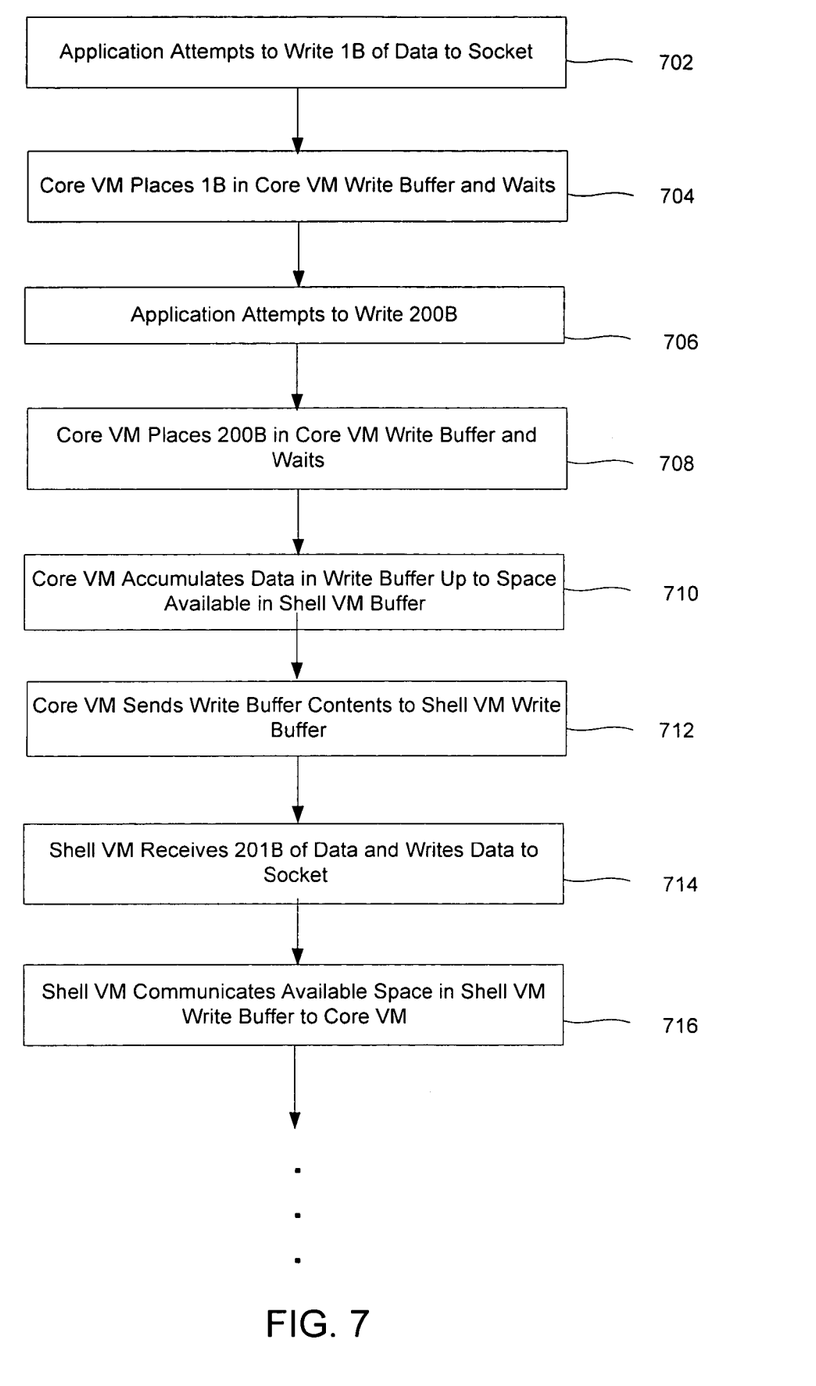
FIG. 7 is a flowchart illustrating an example of a sequence of writes to a socket.

FIG. 7 is a flowchart illustrating an example of a sequence of writes to a socket. This is an example of the processes of FIGS. 5A and 5B performed on system 200. In this example, application 203 attempts to write 1 byte of data to socket interface 206 (702). Core VM 202 places 1 byte in core VM write buffer 210 and waits (704). Application 203 attempts to write 200 bytes of data to socket interface 206 (706). Core VM 202 places 200 bytes in core VM write buffer 210 and waits (708). Core VM write buffer 210 now has 201 bytes of data. Core VM 202 accumulates data in core VM write buffer 210 up to space available in core VM write buffer 214 (710). Core VM 202 sends the contents of core VM write buffer 210 to shell VM 204 (712). Shell VM 204 receives the data and writes the data to socket interface write buffer 218 (714). Shell VM communicates the amount of available space in shell VM write buffer 214 back to core VM 202 (716). For example, an ACK message is sent. The process continues similarly.

Figure 8:
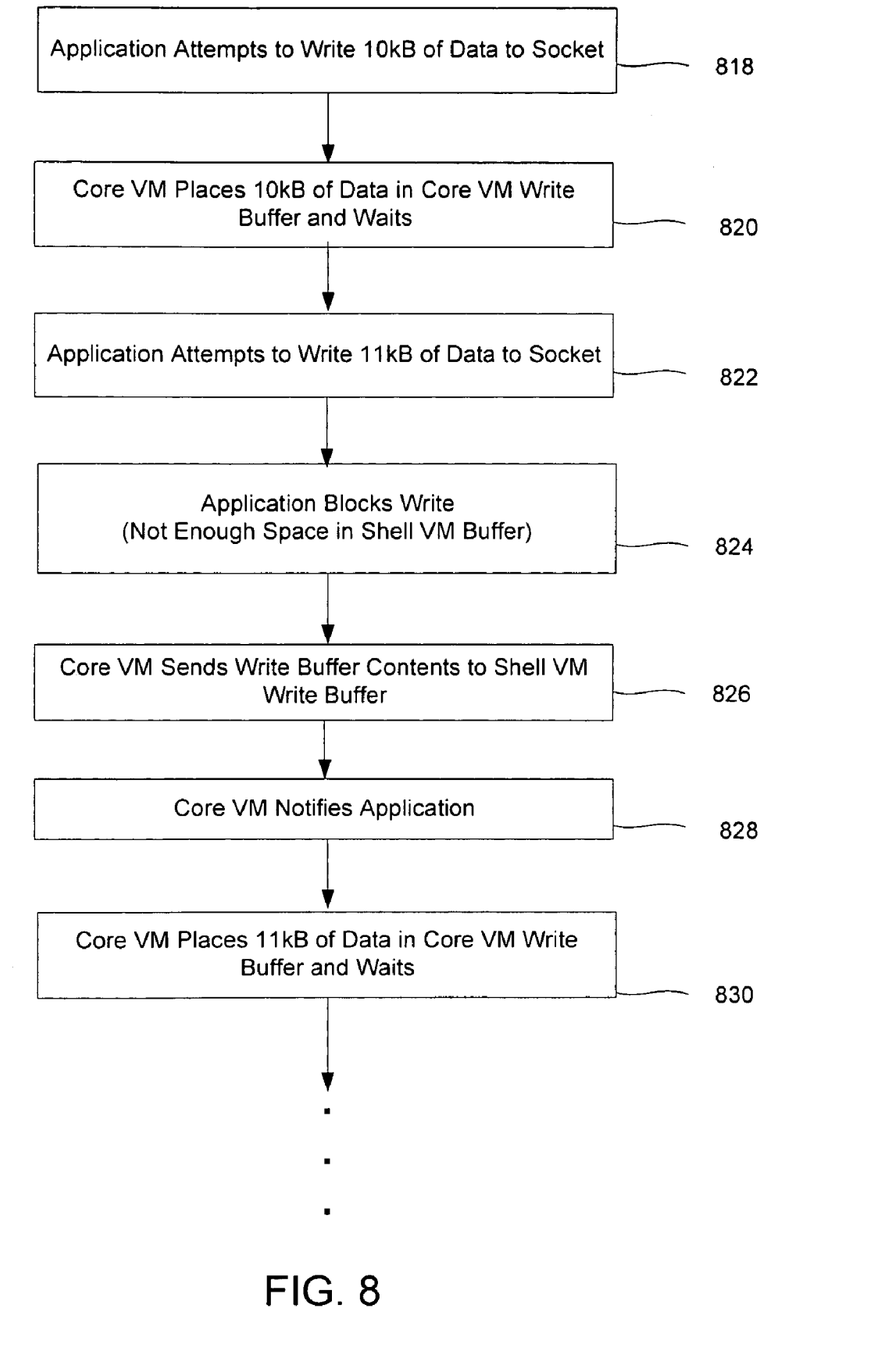
FIG. 8 is a flowchart illustrating another example of a sequence of writes to a socket.

FIG. 8 is a flowchart illustrating another example of a sequence of writes to a socket. This is an example of the processes of FIGS. 5A and 5B performed on system 200. In this example, shell VM write buffer 214 is initially empty. Shell VM write buffer 214 is 20 kB in size. In this example, application 203 attempts to write 10 kB of data to the socket (818). Core VM 202 places 10 kB in core VM write buffer 210 and waits (820). Application 203 attempts to write 11 kB of data to socket interface 206 (822). Application 203 blocks the write because there is not enough space available in shell VM write buffer 214 to accommodate the accumulated 21 kB of data in core VM write buffer 210 (824). Core VM 202 sends the contents of core VM write buffer 210 to shell VM 204 (826). Core VM 202 receives information about the amount of available space in shell VM write buffer 214. When there is 11 kB of space available, core VM 202 notifies application 203 (828). Core VM 202 places 11 kB of data in core VM write buffer 210 to satisfy the blocked write request and waits (830). The process continues similarly. (828) is optional. For example, application 203 may later (e.g., periodically) attempt to write the 11 kB of data.

In the examples described in FIGS. 6-8, data is read into a sending buffer up to the available space in a receiving buffer. In the case of a read, data is read into shell VM read buffer 212 up to the available space in core VM read buffer 208. In the case of a write, data is written into core VM write buffer 210 up to the available space in shell VM write buffer 214. This can ensure that more data is not sent than can be stored in the final receiving buffer. Alternatively, data can be read into the sending buffer up to the available space in the sending buffer, and data is sent to the receiving buffer up to the available space in the receiving buffer. For example, in the case of a read, data is read into shell VM read buffer 212 up to the available space in shell VM read buffer 212, but data is sent up to the available space in shell VM read buffer 212. In the case of a write, data is written into core VM write buffer 210 up to the available space in core VM write buffer 210, but sent up to the available space in shell VM write buffer 214.

When reading, an application can use a blocking read (in which case the read will wait until data is available) or a non blocking read (in which case the read will return regardless of the number of bytes read). Both forms return the number of bytes actually read. Similarly, when writing, an application can use a blocking write (in which case the write will wait until space is available) or a non blocking write (in which case the write will return regardless of the number of bytes written). Both forms return the number of bytes actually written.

In some implementations, a blocking read will return as long as at least one byte was read, and the return value indicates how many bytes were read. It will block only if there is no data available. Some blocking write implementations will return only after at least one byte was written, and the return value indicates how many bytes were written.

In some embodiments, the receiving and sending buffers for each path are the same size. For example, core VM read buffer 208 and shell VM read buffer 212 could be the same size and core VM write buffer 210 and shell VM write buffer 214 could be the same size. In some embodiments, the size of each buffer varies according to the amount of data that is sent or received at that buffer.

In some cases, there may be native code running on the shell VM that interacts with the interface (e.g., socket). For example, the shell VM may make a JNI call to a native C program that is interacting with the socket at the same time. In this case, an intercept library is provided that intercepts native API calls from the shell VM that interact with the same socket being buffered. The calls may be intercepted and redirected to the core VM.

In some embodiments, data is transferred from an interface buffer to a shell VM buffer when the interface is being closed. In some embodiments, a request to close the interface is complete when all buffered data in the core VM buffer and shell VM buffer is transferred to the interface buffer. In some embodiments, a request to close the interface is complete when all buffered data in the core VM buffer, shell VM buffer, and interface buffer is transferred to the external data destination.

Core VM 202 and shell VM 204 may run on the same or separate devices. In some embodiments, state information between the core VM and the shell VM is synchronized. State information can include, for example: time; file state (e.g., existence, last modified time, size, file content); and directory structure. For example, one segment of the VM (i.e., the core VM or the shell VM) could periodically execute an RPC requesting the local time on the other segment. Having to send updates between the shell VM and core VM increases latency in the segmented VM. One approach to reducing latency is to send updates less frequently and have one segment of the VM cache the state information. For example, the directory structure can be cached on one segment. When a path needs to be built, the cached directory structure can be used. The cached directory structure is updated when there is a change in the directory structure on the other segment.

A state model can be maintained to model the state of the other segment. Based on the model, the cached state information is updated. If there is a change in state not accounted for by the model, the other segment sends an update. For example, if the state is time, shell VM 204 can send its local time to core VM 202. Core VM 202 updates its local time to match the local time on shell VM 204. In some embodiments, core VM 202 uses a time model to continuously update its local time, rather than rely on updates from shell VM 204. For example, the time model could be a local clock. In some embodiments, shell VM 204 sends updates to core VM 202 periodically to resynchronize the shell VM and core VM. In some embodiments, shell VM 204 sends an update to core VM 202 when there is a change in time on shell VM 204 not accounted for by the model. For example, a user might change the time manually. Similarly, shell VM 204 can run a state model while core VM 202 is the segment sending the updates.

An application running on a first segment of the VM could send a request to the second segment of the VM to initiate the receiving and storing of state information on the first segment. The request could be for state information or to modify state information. In some embodiments, when a segment makes a request to modify the state information, the state information stored in that segment is invalidated. In some embodiments, the state information expires after a period of time. In some embodiments, the state information does not change unless a certain amount of time has elapsed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of reducing latency in a segmented virtual machine (VM), comprising:
   receiving first segment state information regarding the first segment from a first segment of the VM at a second segment of the VM;
   storing the first segment state information on the second segment of the VM;
   automatically determining future first segment state information on the second segment of the VM without having to receive updates from the first segment
   wherein the first segment is a core VM and the second segment is a shell VM; and
   wherein the first segment state includes time, file state, or a directory state.

2. A method as recited in claim 1, further including updating the first segment state information on the second segment of the VM based on the future state information.

3. A method as recited in claim 1, wherein the future first segment state information does not change unless an update is received from the first segment of the VM.

4. A method as recited in claim 1, wherein the future first segment state information does not change unless an amount of time has elapsed.

5. A method as recited in claim 1, further including receiving updated first segment state information from the first segment of the VM.

6. A method as recited in claim 1, wherein a request for first segment state information by an application running on the second segment of the VM initiates the receiving and storing of the state information.

7. A method as recited in claim 1, wherein a request to modify first segment state information made by an application running on the second segment of the VM initiates the receiving and storing of the first segment state information.

8. A method as recited in claim 1, wherein a request to modify first segment state information made by an application running on the second segment of the VM invalidates the first segment state information stored in the second segment of the VM.

9. A method as recited in claim 1, wherein the first segment state information stored in the second segment of the VM expires after a period of time.

10. A method as recited in claim 1, further including receiving new first segment state information from the first segment to the second segment.

11. A method as recited in claim 1, further including receiving new first segment state information from the first segment to the second segment when there is a change in state.

12. A method as recited in claim 1, wherein the first segment is a shell VM and the second segment is a core VM.

13. A method as recited in claim 1, wherein future first segment state information is determined at least in part based on a state model configured to model the state of the first segment without having to receive updates from the first segment.

14. A system for reducing latency in a segmented virtual machine (VM), comprising:
   a processor configured to:
      receive first segment state information regarding the first segment from a first segment of the VM at a second segment of the VM;
      store the first segment state information on the second segment of the VM; and
      automatically determine future first segment state information on the second segment of the VM without having to receive updates from the first segment; and
   a memory coupled with the processor, wherein the memory provides the processor with instructions
   wherein the first segment is a core VM and the second segment is a shell VM; and
   wherein the first segment state includes time, file state, or a directory state.

15. A system as recited in claim 14, wherein the processor is further configured to update the first segment state information on the second segment of the VM based on the future state information.

16. A system as recited in claim 14, wherein the future first segment state information does not change unless an update is received from the first segment of the VM.

17. A system as recited in claim 14, wherein the future first segment state information does not change unless an amount of time has elapsed.

18. A system as recited in claim 14, wherein the processor is further configured to receive updated first segment state information from the first segment of the VM.

19. A system as recited in claim 14, wherein a request for first segment state information by an application running on the second segment of the VM initiates the receiving and storing of the state information.

20. A system as recited in claim 14, wherein a request to modify first segment state information made by an application running on the second segment of the VM initiates the receiving and storing of the first segment state information.

21. A system as recited in claim 14, wherein a request to modify first segment state information made by an application running on the second segment of the VM invalidates the first segment state information stored in the second segment of the VM.

22. A system as recited in claim 14, wherein the first segment state information stored in the second segment of the VM expires after a period of time.

23. A system as recited in claim 14, wherein the processor is further configured to receive new first segment state information from the first segment to the second segment.

24. A system as recited in claim 14, wherein the processor is further configured to receive new first segment state information from the first segment to the second segment when there is a change in state.

25. A system as recited in claim 14, wherein the first segment is a shell VM and the second segment is a core VM.

26. A system as recited in claim 14, wherein future first segment state information is determined at least in part based on a state model configured to model the state of the first segment without having to receive updates from the first segment.

27. A computer program product for reducing latency in a segmented virtual machine (VM), the computer program product being embodied in a non-transitory computer readable medium and comprising computer instructions for:
- receiving first segment state information regarding the first segment from a first segment of the VM at a second segment of the VM;
- storing the first segment state information on the second segment of the VM; and
- automatically determining future first segment state information on the second segment of the VM without having to receive updates from the first segment
- wherein the first segment is a core VM and the second segment is a shell VM; and
- wherein the first segment state includes time, file state, or a directory state.

28. A computer program product as recited in claim 27, further including updating the first segment state information on the second segment of the VM based on the future state information.

29. A computer program product as recited in claim 27, wherein the future first segment state information does not change unless an update is received from the first segment of the VM.

30. A computer program product as recited in claim 27, wherein the future first segment state information does not change unless an amount of time has elapsed.

31. A computer program product as recited in claim 27, further including receiving updated first segment state information from the first segment of the VM.

32. A computer program product as recited in claim 27, wherein a request for first segment state information by an application running on the second segment of the VM initiates the receiving and storing of the state information.

33. A computer program product as recited in claim 27, wherein a request to modify first segment state information made by an application running on the second segment of the VM initiates the receiving and storing of the first segment state information.

34. A computer program product as recited in claim 27, wherein a request to modify first segment state information made by an application running on the second segment of the VM invalidates the first segment state information stored in the second segment of the VM.

35. A computer program product as recited in claim 27, wherein the first segment state information stored in the second segment of the VM expires after a period of time.

36. A computer program product as recited in claim 27, further including receiving new first segment state information from the first segment to the second segment.

37. A computer program product as recited in claim 27, further including receiving new first segment state information from the first segment to the second segment when there is a change in state.

38. A computer program product as recited in claim 27, wherein the first segment is a shell VM and the second segment is a core VM.

39. A computer program product as recited in claim 27, wherein future first segment state information is determined at least in part based on a state model configured to model the state of the first segment without having to receive updates from the first segment.

* * * * *